US006758967B1

(12) United States Patent
Anderson, Jr. et al.

(10) Patent No.: US 6,758,967 B1
(45) Date of Patent: Jul. 6, 2004

(54) LIQUID CHROMATOGRAPHY APPARATUS HAVING TWO STATIONARY PHASES

(75) Inventors: James M. Anderson, Jr., Arlington Heights, IL (US); Raaidah Saari-Nordhaus, Antioch, IL (US)

(73) Assignee: Alltech Associates, Inc., Deerfield, IL (US)

( * ) Notice: Subject to any disclaimer, the term of this patent is extended or adjusted under 35 U.S.C. 154(b) by 0 days.

(21) Appl. No.: 10/424,514

(22) Filed: Apr. 28, 2003

(51) Int. Cl.[7] ............................................. B01D 15/08
(52) U.S. Cl. ............................. 210/198.2; 210/502.1; 210/635; 210/656
(58) Field of Search .................................. 210/635, 656, 210/198.2, 502.1; 502/401, 402

(56) References Cited

U.S. PATENT DOCUMENTS

| | | | | |
|---|---|---|---|---|
| 4,755,294 A | * | 7/1988 | Pradet et al. ............ 210/198.2 |
| 5,595,650 A | * | 1/1997 | Manz ....................... 210/198.2 |
| 5,648,268 A | * | 7/1997 | Batchelder et al. ............ 436/57 |
| 5,865,994 A | | 2/1999 | Riviello et al. .......... 210/198.2 |
| 5,968,363 A | * | 10/1999 | Riviello et al. ............. 210/635 |
| 6,207,039 B1 | * | 3/2001 | Moulton et al. ............ 205/703 |

* cited by examiner

Primary Examiner—Ernest G. Therkorn
(74) Attorney, Agent, or Firm—Brinks Hofer Gilson & Lione; G. Peter Nichols (57) ABSTRACT

An ion exchange chromatography apparatus includes a first stationary phase and a second stationary phase. The first stationary phase has at least one complexing agent functional group capable of forming a complex with at least one ion present in a sample that contains at least two ions when the sample contacts the first stationary phase. The second stationary phase is distinct from the first stationary phase and has at least one non-complexing agent functional group capable of exchanging with the ions present in the sample, other than the one complexed by the complexing agent functional group.

27 Claims, 6 Drawing Sheets

PEAK ID:
1. LITHIUM
2. SODIUM
3. AMMONIUM
4. POTASSIUM
5. MAGNESIUM
6. CALCIUM

FIG. 3

PEAK ID:
1. LITHIUM
2. SODIUM
3. AMMONIUM
4. POTASSIUM
5. MAGNESIUM
6. CALCIUM

FIG. 4

PEAK ID:
1. LITHIUM
2. SODIUM
3. AMMONIUM
4. MAGNESIUM
5. CALCIUM
6. POTASSIUM

MOBILE PHASE: 3mM METHANESULFONIC ACID
FLOWRATE: 1.0mL/MIN
PEAK ID:

1. LITHIUM
2. SODIUM
3. AMMONIUM
4. MAGNESIUM
5. CALCIUM
6. POTASSIUM

MOBILE PHASE: 3mM METHANESULFONIC ACID
FLOWRATE: 1.0mL/MIN
PEAK ID:

1. LITHIUM
2. SODIUM
3. AMMONIUM
4. MAGNESIUM
5. CALCIUM
6. POTASSIUM

FIG. 7A

MOBILE PHASE: 3mM METHANESULFONIC ACID
FLOWRATE: 1.0mL/MIN
PEAK ID:

1 LITHIUM
2 SODIUM
3 AMMONIUM
4 MAGNESIUM
5 CALCIUM
6 POTASSIUM

| | | |
|---|---|---|
| 1 | SODIUM | 100 PPM |
| 2 | AMMONIUM | 20 PPB |
| 3 | MAGNESIUM | 20 PPB |
| 4 | CALCIUM | 100 PPB |

LIQUID CHROMATOGRAPHY APPARATUS HAVING TWO STATIONARY PHASES

The present invention relates to a novel liquid chromatography apparatus. More particularly, the present invention relates to an improved chromatographic apparatus and a method for performing ion-exchange chromatography such as anion or cation exchange chromatography. The apparatus includes a first stationary phase with exchangeable complexing agents. The apparatus also includes a second stationary phase different and distinct from the first stationary phase. The second stationary phase has exchangeable standard ion exchange groups. Cation exchange functional groups include sulfonates, carboxylates, and phosphonates. Anion exchange functional groups include quaternary amines, alkanol quaternary amines, trimethylammonium, alkyl quaternary ammoniums, and others. The apparatus provides desirable separation characteristics and selectivity for numerous cationic species including alkali metals, alkaline-earth metals, ammonium, amines, and the like and for anionic species such as fluoride, chloride, nitrite, bromide, nitrate, phosphate, sulfate, bromate, chlorite, chlorate, borate, silicate, formate, dichloroacetate, perchlorate, chromate, oxalate, thiosulfate, iodide, thiocyanate, monofluorphosphate, acetate, citrate, selenite, arsenate, selenate, tungstate, molybdate, etc.

The separation of cations from a mixture of different cations is typically accomplished by cation-exchange chromatography using a cation-exchange stationary phase with ionic, acidic groups as the cation exchangers. Cation-exchange chromatography is a known technique for the analysis and separation of cations in solutions. The technique typically includes a chromatographic separation step using an eluant solution containing an electrolyte. During the chromatographic separation step, cations of an introduced sample are eluted through a chromatography column that comprises an insoluble stationary phase having functional cation-exchange groups. Cations traversing through the column and contacting the stationary phase are then capable of exchanging at these functional cation-exchange sites. Cations that interact with the cation-exchange sites for longer periods elute from the chromatography column after cations that interact with those sites for shorter periods. For the most part, ionic acidic groups such as sulfonate, carboxylate, or phosphonate groups or mixtures thereof are used as the primary functional groups of typical cation-exchange columns.

Depending upon the type of functional group that is linked to the stationary phase of a typical cation-exchange chromatography column, different cation elution profiles are obtained. For example, standard cation-exchange chromatography columns that use a mixture of carboxylate and phosphonate functional groups provide an elution profile where lithium elutes from the column first followed in order by sodium, ammonium, potassium, magnesium, manganese, and finally calcium. Some cationic species, however, elute in peaks that overlap with other cationic species that elute either immediately before or immediately after. As a result, the separation is less than desired. Moreover, when one cationic species is present at significantly higher concentrations than another cationic species, separation of the two from a mixture of them may be very difficult. For example, many environmental and industrial samples contain relatively high levels of sodium in comparison to the levels of ammonium (at times, it may be in a ratio of about 5000:1, sodium to ammonium). A typical cation chromatography column has a difficulty in separating the sodium from the ammonium so that analysis of each can be conducted.

Similar issues arise with respect to the separation of anions from a mixture of different anions. An apparatus and method to enhance the separation capabilities of ion-exchange chromatography columns, therefore, would be very useful.

Recently, it has been found that particular complexing agents, crown ethers, may be useful in cation chromatographic separation. Crown ethers are macrocyclic polyether compounds that are capable of selectively forming complexes with a variety of different cationic species. These compounds are referred to as "crowns" because their chemical structures resemble the shape of the regal crown and because of their ability to "crown" cationic species by complexation. The ability of a crown ether molecule to complex with a cation is dependent upon the size of the hole formed by macrocyclic structure and, as a result, crown ethers of different sizes exhibit significantly different specificities for the complexation of cations. For example, some crown ethers readily form complexes with potassium and ammonium. The cation complexation characteristics of many crown ether molecules have been well documented in the literature.

Crown ether compounds have been used in the mobile phase to improve, for example, the separation between sodium and ammonium. A disadvantage to this use is that crown ethers are considered to be toxic and require special handling and disposal practices.

Accordingly, it has been suggested to incorporate crown ether compounds as part of chromatographic stationary phases. Cation-exchange resins based solely upon crown ether functional groups, however, often exhibit poor chromatographic efficiency due to the slow rate of binding and release of the cation from the crown ether macrocycle structure and may be too selectively "cation-specific" for many applications.

One solution is proposed in U.S. Pat. No. 5,865,994, which describes the use of synthetic resin particles having both crown ether functional groups and standard non-crown ether cation-exchange functional groups such as sulfonates, carboxylates, or phosphonates that are attached to the same synthetic resin particles. This patent refers to such resin as bifunctional cation-exchange resin. In other words, the single resin particle contains two differing functional groups, a crown ether functional group, and a non-crown ether functional group.

One disadvantage to this approach is that not all chromatographic analyses require the use of a crown ether to achieve effective separation. Therefore, in those situations, one must replace the so-called bifunctional cation-exchange resin with, for example, a standard non-crown ether cation exchange resin. As a result, a number of different columns will be required, which increases the complexity and cost of the system. Another disadvantage is that the crown ether compounds may not have the selectivity desired for the separation of one or more ions.

The present invention addresses these disadvantages by providing an apparatus that has a first stationary phase with at least one complexing agent and a second stationary phase; distinct from the first stationary phase, with non-complexing agent functional groups. In one aspect of the present invention, the first and second stationary phases may be placed in series. One advantage to this aspect is that one can easily switch modes by simply selectively flowing the eluant (and/or the sample) through either the first stationary phase or the second stationary phase or through both the first and the second stationary phases.

SUMMARY OF THE INVENTION

In accordance with the present invention, a novel ion-exchange chromatography apparatus provides an enhanced ability to separate ions from a mixture of different ions. For example, in one embodiment, the present invention is useful for separating cations from a mixture of different cations. The apparatus and method of the present invention are particularly useful in enhancing the separation of cations that elute from standard sulfonate-, carboxylate- or phosphonate-based chromatography columns at approximately the same time and/or in detecting the presence of a trace amount of one cation in a large excess concentration of another different cation. The apparatus and method allows the normal elution profile of some cationic species to be shifted so that the elution of that species is delayed to provide for enhanced cationic separation. The present invention, therefore, provides a novel apparatus and methods that provide unique separation characteristics for numerous cationic species including alkali metals, alkaline-earth metals, ammonium, amines, and the like.

Similarly, in another embodiment, the present invention is useful for separating anions from a mixture of different anions. The apparatus and method of the present invention are particularly useful in enhancing the separation of anions that elute from standard quaternary amine or quaternary ammonium based chromatography columns at approximately the same time and/or in detecting the presence of a trace amount of one anion in a large excess concentration of another different anion. The apparatus and method allows the normal elution profile of some anionic species to be shifted so that the elution of that species is delayed to provide for enhanced anionic separation. The present invention, therefore, provides a novel apparatus and methods that provide unique separation characteristics for numerous anionic species including but not limited to fluoride, chloride, nitrite, bromide, nitrate, phosphate, sulfate, bromate, chlorite, chlorate, perchlorate, chromate, oxalate, thiosulfate, iodide, etc.

In this regard, one aspect of the present invention provides an apparatus for use in ion-exchange chromatography that comprises a first stationary phase and a second stationary phase that is distinct from the first stationary phase. The first stationary phase includes at least one complexing agent. Where the apparatus or method is used to separate cations, the complexing agent may be selected from the group consisting of polycarboxylic acid chelating agents, such as tetrahydrofuran-2,3,4,5-tetracarboxylic acid, ethylenediaminetetraacetic acid, N-hydroxyethylenediaminetetraacetic acid (HEDTA), diethylenetriaminepentaacetic acid (DTPA), porphyrins, porphine, dimercaprol, nitrilotriacetic acid, morpholine, vinylidene-1,1-diphosphonic acid, and crown ethers. Where the apparatus or method is used to separate anions, the complexing agent may be selected from the group consisting of crown ethers (such as benzo-18-crown-6, dibenzo-14-crown4, dibenzo-21-crown-7), cryptands, calixarenes, pyridine, unithiol, neutral Lewis Acid host molecule containing tin, mercury complexing agents, and mixtures thereof.

The complexing agent is attached to the first stationary phase and is capable of forming complexes with at least one ion present in a sample in contact with the first stationary phase. Non-complexing agent functional groups are attached to the second stationary phase and are capable of interacting with ions present in a sample in contact with the second stationary phase. As used in the following specification and claims, the term "attached" includes bonding, coating, chemically binding and /or reacting, as well as other known means for attaching the complexing agents and the non-complexing agent functional groups to the respective stationary phase.

As used in the following specification and claims, the phrase "non-complexing agent functional groups" includes the known ionic, acidic groups as cation exchangers such as carboxylate, phosphonate, and sulfonate groups as well as the known ionic anion exchangers such as quaternary amines, alkanol quaternary amines, trimethylammonium, alkyl quaternary ammoniums, and others. The phrase is meant to exclude the complexing agents described above and in the following specification.

In one aspect of the present invention, the first stationary phase comprises a first group of support particles and the second stationary phase comprises a second group of support particles that are distinct from the first group of support particles.

In one embodiment, the first group of support particles and the second group of support particles are contained in a single column. In a second embodiment, the first group of support particles and the second group of support particles are contained in separate columns. The columns are arranged such that the eluant (and sample) successively contacts either the first group of support particles and then the second group of particles or the second group of support particles and then the first group of support particles.

Another aspect of the present invention provides a method for separating a first cation from a second different cation in a sample that comprises at least the first and second cations. The method comprises contacting an eluant (and a sample containing cations) with a first stationary phase having complexing agent functional groups attached to the first stationary phase and with a second stationary phase having non-complexing agent functional groups attached to the second stationary phase, such that the first stationary phase and the second stationary phase are distinct. In one embodiment, the first stationary phase is provided in a first column and the second stationary phase is provided in a second column in series with the first column, such that the eluant (and the sample) successively contacts the first stationary phase and then the second stationary phase.

Similarly, another aspect of the present invention provides a method for separating a first anion from a second different anion in a sample that comprises at least the first and second anions. The method comprises contacting an eluant (and a sample containing anions) with a first stationary phase having complexing agent functional groups attached to the first stationary phase and with a second stationary phase having non-complexing agent functional groups attached to the second stationary phase, such that the first stationary phase and the second stationary phase are distinct. In one embodiment, the first stationary phase is provided in a first column and the second stationary phase is provided in a second column in series with the first column, such that the eluant (and the sample) successively contacts the first stationary phase and then the second stationary phase.

BRIEF DESCRIPTION OF THE DRAWINGS

FIG. 4 shows an elution profile of various cations on an apparatus according to the present invention in a suppressor mode where the eluant (and the sample) successively flows through a first stationary phase having a complexing agent functional group in the form of crown ether functional groups and then through a second stationary phase having non-crown ether functional groups. In the suppression stage, the electrical conductivity of the eluant is suppressed but not that of the separated ions so that the latter may be detected by a conductivity cell. This technique is described in detail, for example, in U.S. Pat. Nos. 3,897,213, 3,920,397, and 3,925,019. The sample contains a mixture of lithium, sodium, ammonium, potassium, magnesium, and calcium ions. The peak numbers refer to the following cations: 1-lithium, 2-sodium, 3-ammonium, 4-magnesium, 5-calcium, and 6-potassium.

DESCRIPTION OF THE INVENTION

The apparatus of the present invention comprises a first stationary phase having a complexing agent functional group and a second stationary phase have a non-complexing agent functional group. Desirably, the complexing agent functional group is attached to the first stationary phase. The complexing agent is capable of forming complexes with at least one ion present in an eluant (and/or sample) in contact with the first stationary phase. As a result, the elution of the at least one ion from the eluant (or sample) is delayed. The apparatus also includes a second stationary phase distinct from the first stationary phase. The second stationary phase has at least one type of non-complexing agent functional group. Desirably, the non-complexing agent functional group is attached to the second stationary phase. The non-complexing agent ion-exchange functional group is capable of interacting and exchanging with ions present in the sample (or eluant).

The stationary phase may be in resin form, impregnated into a membrane, or in the form of a monolith (porous rod) material. Those skilled in the art will appreciate the term "stationary phase" as used in the specification and claims is meant to include, for example, chromatography packing material, coatings of chromatography material containing chromatography stationary phases coated on the wall proximate to the flow of the aqueous stream, hollow tubing containing chromatography stationary phases, as well as other stationary phases commonly used in chromatography.

In one aspect, the first and the second stationary phase include first and second support particles, respectively. The first and second support particles useful in the apparatus of the present invention may be organic or inorganic in nature and may be formed from any suitable insoluble chromatographic material that will support the attachment of the complexing agent and the non-complexing agent ion-exchange functional groups described below. For example, synthetic polymer ion-exchange resins such as poly(phenolformaldehyde), polyacrylic, or polymethacrylic acid or nitrile, amine-epichlorohydrin copolymers, graft polymers of styrene on polyethylene or polypropylene, poly(2-chloromethyl-1,3-butadiene), poly(vinylaromatic) resins such as those derived from styrene, alpha-methylstyrene, chlorostyrene, chloromethylstyrene, vinyltoluene, vinylnaphthalene or vinylpyridine, corresponding esters of methacrylic acid, styrene, vinyltoluene, vinylnaphthalene, and similar unsaturated monomers, monovinylidene monomers including the monovinylidine ring-containing nitrogen heterocyclic compounds, copolymers of the above monomers, silica, and $C_{18}$-derivatized silica are all suitable.

The size range for support particles that find use in the present invention is typically from 3–20 $\mu$u, although significantly smaller or larger particles may also find use. The particles may be either porous or non-porous depending upon the particular application desired.

Synthetic resins that may be used as the support particles of the present invention can be formed, for example, by well-known suspension polymerization techniques that involve suspending droplets of monomer in an aqueous medium in which it is insoluble. Under suitable conditions, the monomer will polymerize. This can be accomplished by mixing the monomer with additives in a suspension medium. When this medium is agitated, the monomer disperses into droplets and agitation continues until polymerization is complete. Examples of resins that may be used are the macroporous type that is well known in the art, particularly including styrene-divinylbenzene copolymer.

Other suitable resin particles comprise beads of cross-linked polymer or copolymer, such as styrene-divinylbenzene copolymer that copolymerize in the presence of catalyst such as benzoyl peroxide, containing between about 0% to about 100% divinylbenzene monomer by weight. A detailed review of the preparation, structure, and morphology of styrene-based polymers is provided by Guyot and Bartholin, Prog. Polym. Sci. 8:277–332 (1982).

As noted above, complexing agents are attached to the first stationary phase. "Complexing agents " as defined herein are capable of forming complexes with at least one ion present in an eluant (or sample) in contact with the complexing agent, which will delay the elution of the complexed ion. Many different complexing agents are known in the art and may find use in the present invention for a variety of different applications. Their structures, methods of synthesis and ion complexation characteristics have been well documented.

In one embodiment, where it is desired to complex cations, the complexing agent may be selected from the group consisting of polycarboxylic acid chelating agents, such as tetrahydrofuran-2,3,4,5-tetracarboxylic acid, ethylenediaminetetraacetic acid, N-hydroxyethylenediaminetetraacetic acid (HEDTA), diethylenetriaminepentaacetic acid (DTPA), porphyrins, porphine, dimercaprol, nitrilotriacetic acid, morpholine, vinylidene-1,1-diphosphonic acid, dipicolinic acid, iminodiacetate, cryptands, pyridine, crown ethers, and mixtures thereof. In another embodiment, where it is desired to complex anions, the complexing agent may be selected from the group consisting of crown ethers (such as benzo-18-crown-6, dibenzo-14-crown-4, dibenzo-21-crown-7), cryptands, calixarenes, pyridine, unithiol, neutral Lewis Acid host molecule containing tin, mercury complexing agents, etc.

The complexing agent useful in the apparatus and method of the present invention will be capable of forming a complex with at least one ionic species present in a sample in contact with the complexing agent. Usually, the complexing agent will exhibit selectivity for complexing with from about one to three different ionic species, preferably from about one to two different ionic species and more preferably only one ionic species. Examples of cationic species that may desirably be complexed include, but are not limited to, alkali cations, alkaline earth cations, transition metal cations, such as $K^+$, $NH_4^+$, $Na^+$, $Li^+$, $Cu^+$, $Cu^{++}$, $Pb^{++}$, $Pb^{+4}$, $Zn^+$, $Zn^{++}$, $Ni^+$, $Co^{++}$, and $Fe^{++}$, $Fe^{+++}$. For cations that do not complex with the complexing agent(s) used, the elution profile of those cations is dependent solely upon the types of non-complexing agent cation exchange groups attached to the second stationary phase. The elution of those cations that form a complex with the complexing agent(s) used is delayed relative to the others. As such, the selectivity for any particular cationic species can be optimized by using an appropriate complexing agent that has a known selectivity of interest. As described above, the complexation selectivity of a wide range of different complexing agents has been well documented.

Similarly, examples of anionic species that may desirably be complexed include, but are not limited to, fluoride, chloride, nitrite, bromide, nitrate, phosphate, sulfate, bromate, chlorite, chlorate, borate, silicate, formate, dichloroacetate, perchlorate, chromate, oxalate, thiosulfate, iodide, thiocyanate, monofluorphosphate, acetate, citrate, selenite, arsenate, selenate, tungstate, molybdate, etc. For anions that do not complex with the complexing agent(s) used, the elution profile of those anions is dependent solely upon the types of non-complexing agent anion exchange groups attached to the second stationary phase. The elution of those anions that form a complex with the complexing agent(s) used is delayed relative to the others. As such, the selectivity for any particular anionic species can be optimized by using an appropriate complexing agent that has a known selectivity of interest. As described above, the complexation selectivity of a wide range of different complexing agents has been well documented.

For certain applications, the first stationary phase may comprise two or more different complexing agents, with each of the complexing agents having the same or different cation complexation specificities. In other words, when two or more different complexing agents are used, they may have the same complexation affinities for a particular cation or may have different affinities for complexation with at least one cation. Usually, from about one to three different complexing agents are used with the first stationary phase, desirably from about one to two different complexing agents, and more desirably only one complexing agent.

In one particular aspect of the present invention, the complexing agent is a crown ether. Many crown ethers are known and can be used in the present invention. For example, crown ethers that find use in the present invention include (without being limiting of the present invention) 9-crown-3, 12-crown-4, 15-crown-5, 18-crown-6, 21-crown-7, 24-crown-8, 27-crown-9, 30-crown-10 and crown ether molecules having one or more substituents that are aromatic, such as benzo- or dibenzo-crown ethers, heteroaromatic, particularly derivatives of pyridine, heterocyclic non-aromatic cyclic rings containing oxygen, sulfur or nitrogen, such as tetrahydrofuran, piperidine and pyrrolidine, alicyclic substituents, saturated carbon rings such as cyclopentane and cyclohexane, aliphatic substituents, and the like (see Christensen et al., Chem. Rev. 74:351 (1974), Lindoy, Chem. Soc. Rev. 4:421 (1975), Bradshaw et al., J. Heterocycl. Chem. 11:649 (1974), Christensen et al., Science 174:459 (1971) and Pedersen et al., Angew. Chem. Int. Ed. Engl. 11:16 (1972)). In a desired embodiment, the crown ether is 18-crown6. Such crown ethers are either commercially available or may be synthesized using techniques that are well known in the art.

It is also well known in the art that one or more of the oxygen atoms in the crown ether macrocyclic ring structure may be substituted by either nitrogen (Buschmann et al., (1994) supra), sulfur (Buschmann et al., (1994) supra), phosphorous (Parles et al., J. Amer. Chem. Soc. 92:3500 (1970)) or ——$CH_2$ (Richman et al., J. Amer. Chem. Soc. 96:2268 (1974) and Timko et al., J. Amer. Chem. Soc. 96:7097 (1974) and/or the carbon atoms of the macrocyclic structure may be optionally substituted by alkyl, alkoxy, carboxy, carboxyalkyl, hydroxyalkyl or hydroxyl groups. Use of all of these derivatized crown ether molecules is encompassed by the present invention.

As noted above, "non-complexing agent ion-exchange functional groups" are attached to the second stationary phase. For the most part, the non-complexing agent cation-exchange functional groups that find use herein are those that are well known and commonly used in the field of cation-exchange chromatography, for example, sulfonate, carboxylate, or phosphonate groups. Cation-exchange resins using mixtures of the above described non-complexing agent cation exchange functional groups are also known in the art and may be used with the second stationary phase. When a mixture of non-complexing agent cation exchange functional groups is used, any mixture of such functional groups may by used depending upon the desired application. For example, the mixture could be a mixture of both carboxylate and sulfonate groups. When attached to the second stationary phase, the non-complexing agent cation-exchange functional groups are capable of interacting with cations present in an eluant (and the sample) in contact with the second stationary phase.

Likewise, non-complexing agent anion-exchange functional groups that find use herein are those that are well known and commonly used in the field of anion-exchange chromatography, for example, quaternary amine, alkanol quaternary amine, trimethylammonium, alkyl quaternary ammonium groups. When attached to the second stationary phase, the non-complexing agent anion-exchange functional groups are capable of interacting with anions present in an eluant (and the sample) in contact with the second stationary phase.

The complexing agent functional groups and the non-complexing agent ion exchange functional groups may be attached to their respective stationary phases, e.g., their respective support particles, by methods that are known to those skilled in the art.

The apparatus of the present invention is useful for the separation of ions in eluant (and sample) solutions used in ion exchange chromatography. For example, attempting to detect the presence of trace amounts of ammonium in the presence of large concentrations of sodium in drinking water by using standard sulfonate-, carboxylate-, and/or phosphonate-based cation-exchange columns has proven to be difficult because the large sodium peak often obscures the much smaller ammonium peak that immediately follows. By using the apparatus of the present invention, however, and in particular, a first stationary phase that comprises a crown ether functional group that specifically complexes with the ammonium cation but not with the sodium cation, the elution of ammonium may be delayed relative to sodium, thereby providing a significantly more effective separation and providing an ability to detect the small ammonium peak.

The present invention is well suited for detecting the presence of trace amounts of one cation in the presence of a large excess of another different cation. In this regard, the cation-exchange resins described herein are useful for detecting the presence of a first cation in the presence of a large excess of a second different cation, for example, when the second cation is present at a concentration that is up to 5000-fold greater than the first cation.

Moreover, while commonly used cation-exchange columns are useful for separating cations from various mixtures of cations, the separation achieved is often less than desired because two or more different cations may elute at approximately the same time. By using the apparatus of the present invention, having a first stationary phase with a complexing agent functionality selective for complexing with only one of the two cations that normally elute at approximately the same time, however, an effective and complete separation may be achieved. Therefore, the apparatus of the present invention may be used in a method for separating a first cation from a second cation in a mixture that contains both cations, wherein the complexing agent functional group used is selective for complexing only with the first cation but not the second cation.

By using the apparatus of the present invention, having a first stationary phase with a complexing agent functionality selective for complexing with only one of the two anions that normally elute at approximately the same time, an effective and complete separation may be achieved. Therefore, the apparatus of the present invention may be used in a method for separating a first anion from a second anion in a mixture that contains both anions, wherein the complexing agent functional group used is selective for complexing only with the first anion but not the second anion.

In one embodiment of the present invention, the first stationary phase is provided in a first column and the second stationary phase is provided in a second column, different and distinct from the first column. Desirably, the eluant (or sample) flows through the first column and into the second column. For example, the first stationary phase includes a first group of support particles packed into a first column and having complexing agent functional groups attached to the first group of support particles. The second stationary phase includes a second group of support particles packed in a second column and having non-complexing agent functional groups attached to the second group of support particles. In this embodiment, the eluant (and sample) flows into the first column, through the first column, out the first column and into the second column, through the second column and out the second column. Accordingly, in this embodiment, the eluant (and sample) may flow into the second column or optionally flow in a path around and not through the second column.

Alternatively, the eluant (and sample) may first flow through the second column (the second stationary phase) and then through the first column (the first stationary phase). Advantageously, the first and second stationary phases may be arranged and the eluant (and sample) may flow through either or both of the first and second stationary phases, depending on the cation analysis desired.

In another embodiment, the first and second stationary phases are provided in a single container or apparatus. Accordingly, the complexing agent functional groups provided on the first stationary phase and the non-complexing agent functional groups provided on the second stationary phase are provided in a single container or apparatus. For example, when the first and second stationary phase are separate, first and second support particles, respectively, the support particles are packed into a single column. In this embodiment, the eluant (and sample) flows through the column and contacts each of the first and second support particles.

Further details of the invention are illustrated in the following non-limiting examples.

EXAMPLE 1

In this example, a chromatogram was generated using a non-complexing agent stationary phase with the following parameters.

| | |
|---|---|
| Analytical Column | ALLTECH UNIVERSAL CATION column (silica coated with polybutadiene/maleic acid copolymer) 100 × 4.6 mm |
| Column Temp. | Ambient |
| Eluant | 3 mM Methanesulfonic Acid |
| Flowrate | 1.0 mL/min |
| Detector | Conductivity |

Figure 1:
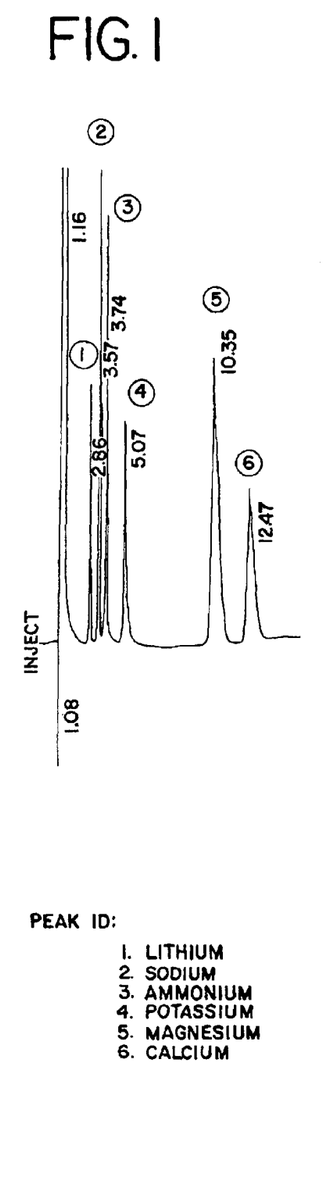
FIG. 1 shows an elution profile of various cations on a typical carboxylate-based cation-exchange column. The elution profile is of a mixture of lithium, sodium, ammonium, potassium, magnesium, and calcium ions from a standard carboxylate-based cation-exchange chromatography column. The peak numbers refer to the following cations: 1-lithium, 2-sodium, 3-ammonium, 4-potassium, 5-magnesium and 6-calcium.
Figure 2:
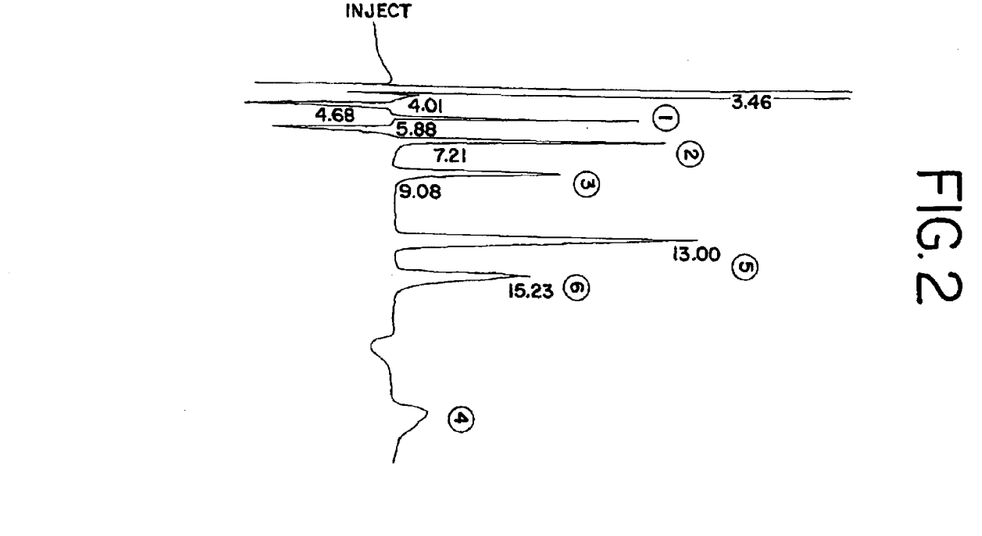
FIG. 2 shows an elution profile of various cations on an apparatus according to the present invention where the eluant (and the sample) successively flows through a first stationary phase having a complexing agent functional group in the form of crown ether functional groups and then through a second stationary phase having non-crown ether functional groups. The sample contains a mixture of lithium, sodium, ammonium, potassium, magnesium, and calcium ions. The peak numbers refer to the following cations: 1-lithium, 2-sodium, 3-ammonium, 4-potassium, 5-magnesium and 6-calcium.
Figure 3:
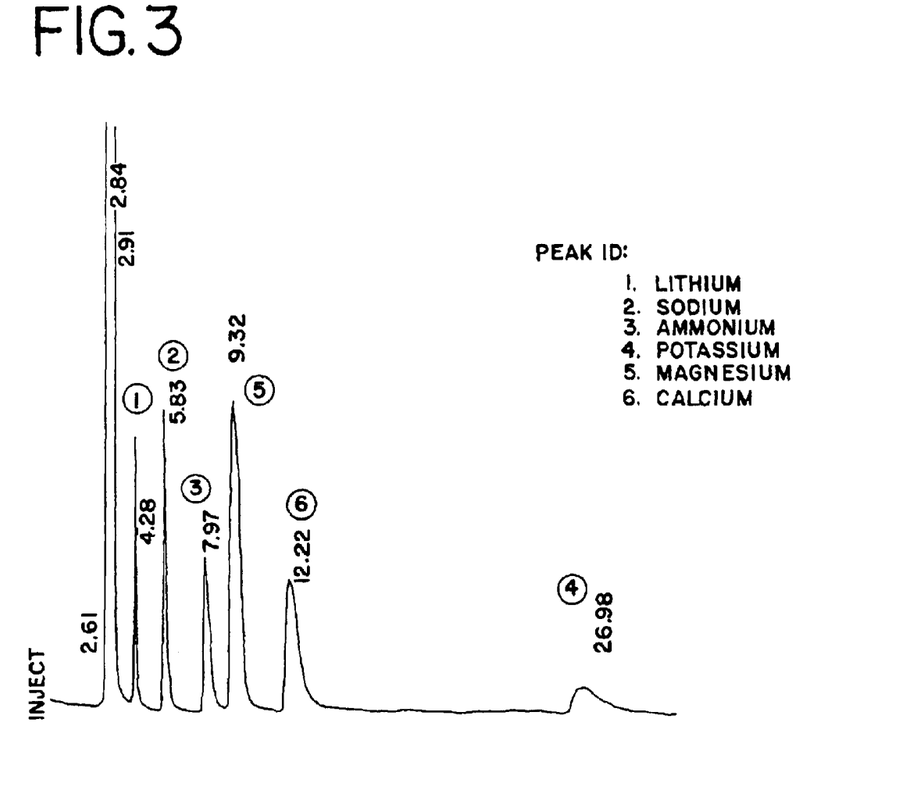
FIG. 3 shows an elution profile of various cations on an apparatus according to the present invention where the eluant (and the sample) flows through a single column that contains a first stationary phase having crown ether functional groups and a second distinct stationary phase having non-crown ether functional groups. The sample contains a mixture of lithium, sodium, ammonium, potassium, magnesium, and calcium ions. The peak numbers refer to the following cations: 1-lithium, 2-sodium, 3-ammonium, 4-potassium, 5-magnesium and 6-calcium.
Figure 4:
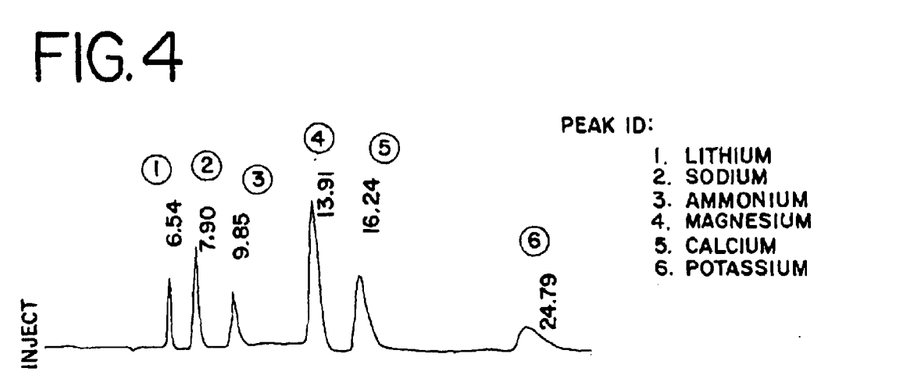
Figure 5A:
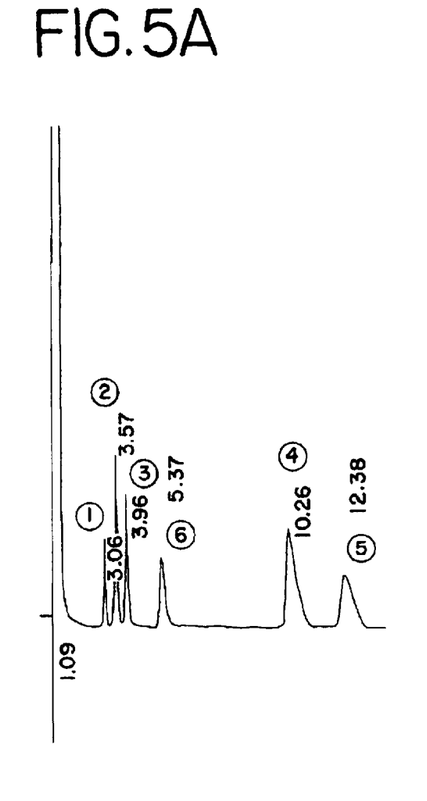
FIGS. 5A and 5B show chromatograms generated according to Example 1.

The chromatogram of FIG. 5A was obtained

To compare the results obtained from the cation column above, with an apparatus according to the present invention, a chromatogram was generated by flowing the sample containing cations first through a complexing agent stationary phase and then through the above non-complexing agent stationary phase. The complexing agent stationary phase had the following parameters.

| | |
|---|---|
| Analytical Column | 18-crown-6 bonded to silica; 100 × 4.6 mm |
| Column Temp. | Ambient |
| Eluant | 3 mM Methanesulfonic Acid |
| Flowrate | 1.0 mL/min |

Figure 5B:
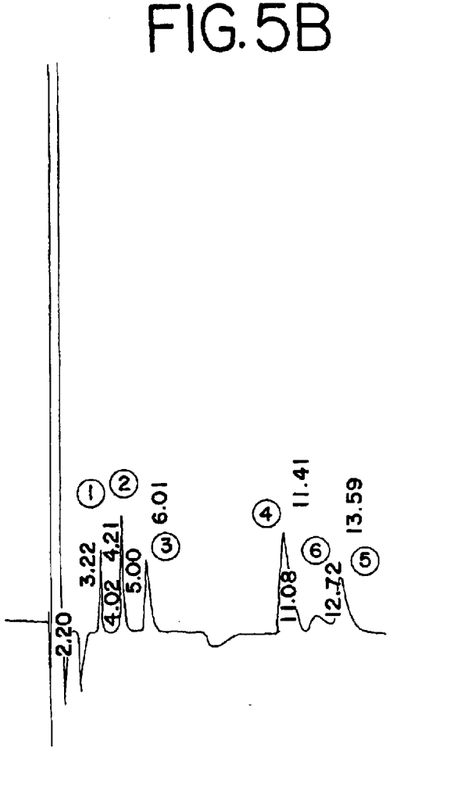

The chromatogram of FIG. 5B was obtained. It will be seen that when the size of the complexing agent stationary phase is similar to the size of the non-complexing agent stationary phase, potassium eluted between magnesium and calcium.

EXAMPLE 2

In this example, a chromatogram was generated using a non-complexing agent stationary phase with the following parameters.

| | |
|---|---|
| Analytical Column | ALLTECH UNIVERSAL CATION column (silica coated with polybutadiene/maleic acid copolymer) 50 × 4.6 mm |
| Column Temp. | Ambient |
| Eluant | 3 mM Methanesulfonic Acid |
| Flowrate | 1.0 mL/min |
| Detector | Conductivity |

Figures 6A, 6B:
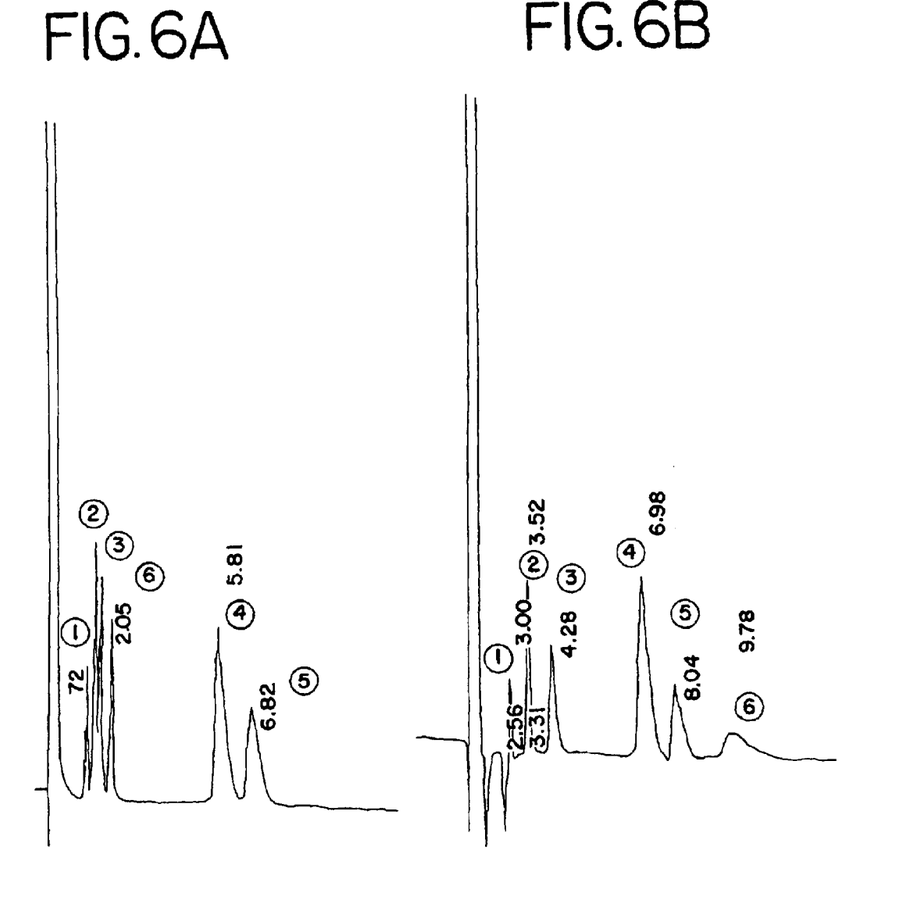
FIGS. 6A and 6B show chromatograms generated according to Example 2.

The chromatogram of FIG. 6A was obtained

To compare the results obtained from the cation column above, with an apparatus according to the present invention, a chromatogram was generated by flowing the sample containing cations first through a complexing agent stationary phase and then through the above non-complexing agent stationary phase. The complexing agent stationary phase had the following parameters.

| | |
|---|---|
| Analytical Column | 18-crown-6 bonded to silica; 100 × 4.6 mm |
| Column Temp. | Ambient |
| Eluant | 3 mM Methanesulfonic Acid |
| Flowrate | 1.0 mL/min |

The chromatogram of FIG. 6B was obtained. It will be noticed that the size of the complexing agent stationary phase was about two times greater than the size of the non-complexing agent stationary phase. It will also be noticed that potassium eluted after both magnesium and calcium and that the resolution between sodium and ammonium was about 0.7 min.

EXAMPLE 3

In this example, a chromatogram was generated using a non-complexing agent stationary phase with the following parameters.

| | |
|---|---|
| Analytical Column | ALLTECH UNIVERSAL CATION column (silica coated with polybutadiene/maleic acid copolymer) 100 × 4.6 mm |
| Column Temp. | Ambient |
| Eluant | 3 mM Methanesulfonic Acid |
| Flowrate | 1.0 mL/min |
| Detector | Conductivity |

Figure 7A:
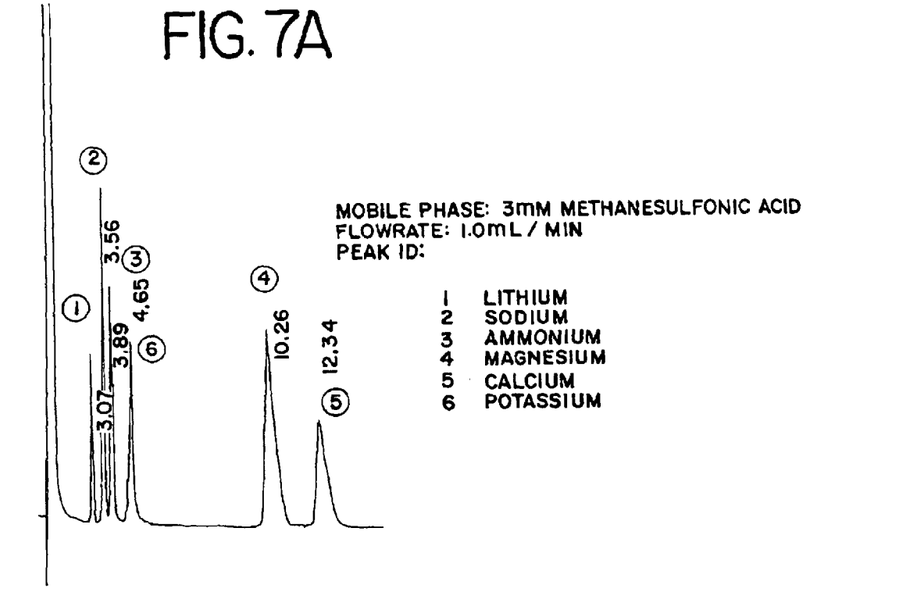
FIGS. 7A and 7B show chromatograms generated according to Example 3.

The chromatogram of FIG. 7A was obtained

To compare the results obtained from the cation column above, with an apparatus according to the present invention, a chromatogram was generated by flowing the sample containing cations first through a complexing agent stationary phase and then through the above non-complexing agent stationary phase The complexing agent stationary phase had the following parameters.

| | |
|---|---|
| Analytical Column | 18-crown-6 bonded to silica; 250 × 4.6 mm |
| Column Temp. | Ambient |
| Eluant | 3 mM Methanesulfonic Acid |
| Flowrate | 1.0 mL/min |

Figure 7B:
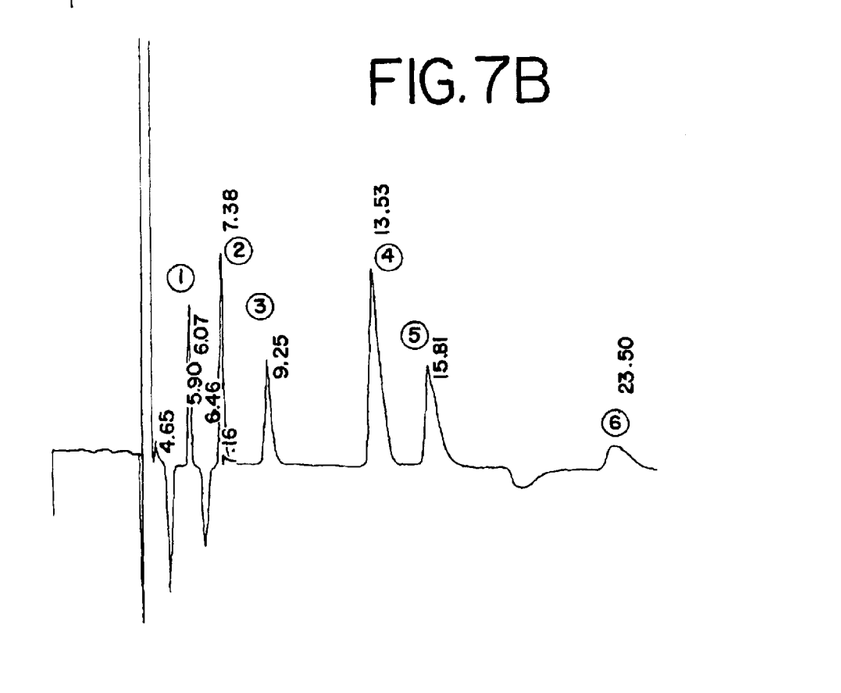

The chromatogram of FIG. 7B was obtained. It will be noticed that the size of the complexing agent stationary phase was about 2.5 times greater than the size of the non-complexing agent stationary phase. It will also be noticed that potassium eluted after both magnesium and calcium and that the resolution between the sodium and potassium was about two minutes.

EXAMPLE 4

In this example, a chromatogram was generated using a system according to the present invention where a sample containing 100 ppm of sodium, 20 ppb of ammonium, 20 ppb of magnesium and 100 ppb of calcium was flowed first through a complexing agent stationary phase and then through a non-complexing agent stationary phase with the complexing agent stationary phase and the non-complexing agent stationary phase having following parameters, respectively.

| | |
|---|---|
| Analytical Column | 18-crown-6 bonded to silica; 250 × 4.6 mm |
| Column Temp. | Ambient |
| Eluant | 3 mM Methanesulfonic Acid |
| Flowrate | 1.0 mL/min |

| | |
|---|---|
| Analytical Column | ALLTECH UNIVERSAL CATION column (silica coated with polybutadiene/maleic acid copolymer) 100 × 4.6 mm |
| Column Temp. | Ambient |
| Eluant | 3 mM Methanesulfonic Acid |
| Flowrate | 1.0 mL/min |
| Detector | Conductivity |

Figure 8:
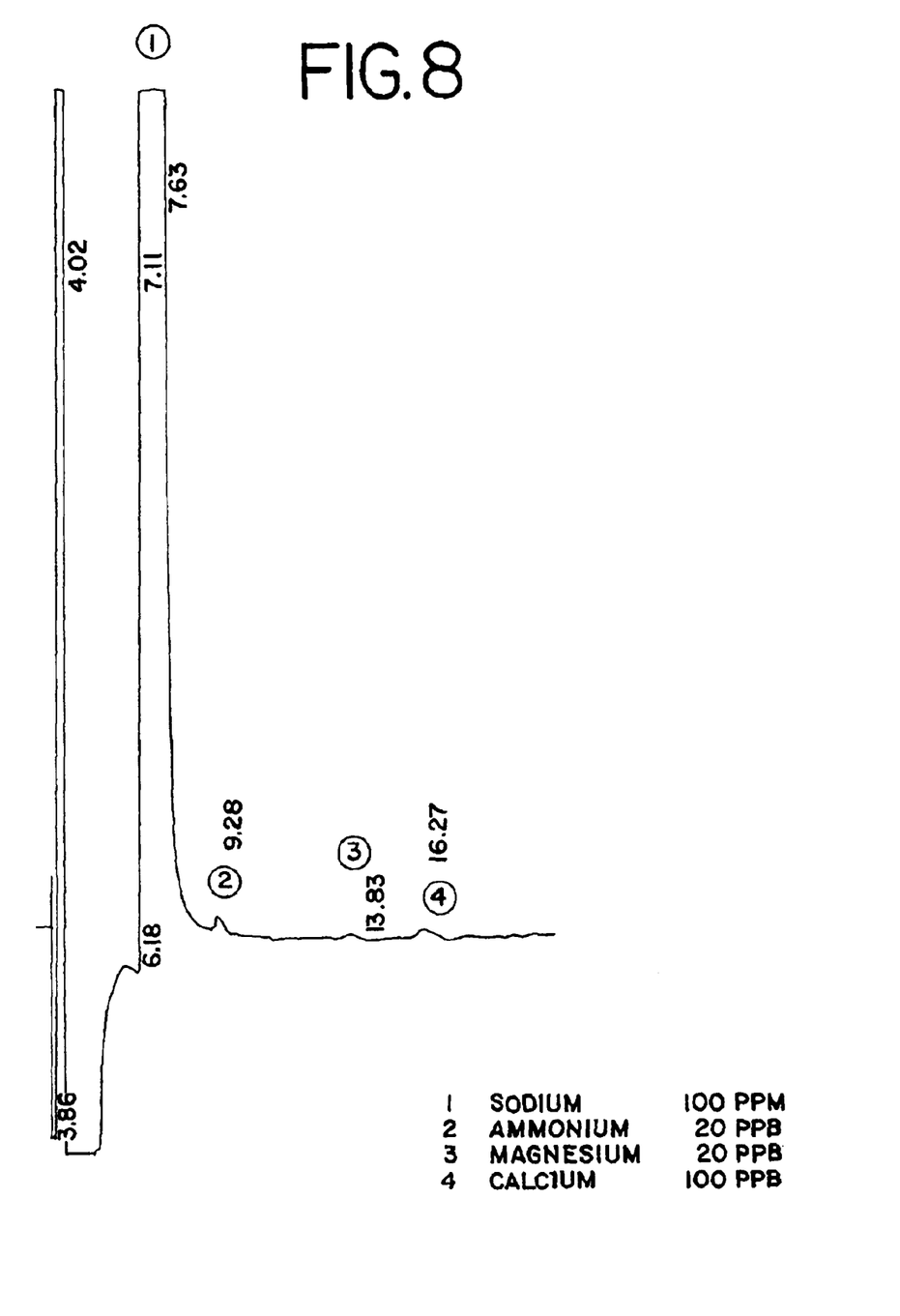
FIG. 8 shows a chromatogram generated according to Example 4.

The chromatogram of FIG. 8 was obtained. It will be seen that, even though the ratio of sodium to ammonium was 5000:1, the system was able to detect the ammonium.

While the examples above described the invention in connection with cation analysis, one skilled in the art would understand that the examples are applicable to anions. In addition, while the invention has been described in conjunction with specific embodiments, it is to be understood that many alternatives, modifications, and variations will be apparent to those skilled in the art in light of the foregoing description. Accordingly, this invention is intended to embrace all such alternatives, modifications, and variations that fall within the spirit and scope of the appended claims.

What is claimed:

1. An ion exchange chromatography apparatus comprising:
   a. a first stationary phase;
   b. complexing agent functional groups attached to the first stationary phase, wherein the complexing agent functional groups are capable of forming complexes with at least one ion present in an eluant in contact with the first stationary phase;
   c. a second stationary phase that is separate from the first stationary phase; and,
   d. non-complexing agent ion-exchange functional groups attached to the second stationary phase, wherein the non-complexing agent ion-exchange functional groups are capable of interacting with ions present in the eluant.

2. The apparatus of claim 1 wherein the first stationary phase and the second stationary phase are disposed in a single column.

3. The apparatus of claim 1 wherein the first stationary phase is disposed in a first column and the second stationary phase is disposed in a second column, wherein the eluant successively contacts the first column and then the second column.

4. The apparatus of claim 1 wherein each of the first stationary phase and the second stationary phase comprise support particles.

5. The apparatus of claim 1 wherein the at least one ion is a cation and wherein the non-complexing agent ion-exchange functional group is capable of interacting with cations present in the eluant.

6. The apparatus of claim 5 wherein the complexing agent functional group is selected from the group consisting of tetrahydrofuran-2,3,4,5-tetracarboxylic acid, ethylenediaminetetraacetic acid, N-hydroxyethylenediaminetetraacetic acid (HEDTA), diethylenetriaminepentaacetic acid (DTPA), porphine, dimercaprol, nitrilotriacetic acid, morpholine, vinylidene-1,1-diphosphonic acid, crown ethers, and mixtures thereof.

7. The apparatus of claim 5 wherein the complexing agent is a crown ether.

8. The apparatus of claim 1 wherein the at least one ion is an anion and wherein the non-complexing agent ion-exchange functional group is capable of interacting with anions present in the eluant.

9. The apparatus of claim 8 wherein the complexing agent is selected from the group consisting of crown ethers, cryptands, calixarenes, pyridine, unithiol, neutral Lewis Acid host molecule containing tin, mercury complexing agents, and mixtures thereof.

10. An ion exchange chromatography apparatus comprising:
   a. a first group of support particles;
   b. complexing agent functional groups attached to the first group of support particles, wherein the complexing agent functional groups are capable of forming complexes with at least one ion present in an eluant in contact with the complexing agent functional groups;
   c. a second group of support particles that are separate from the first group of support particles; and,
   d. non-complexing agent ion-exchange functional groups attached to the second group of support particles, wherein the non-complexing agent ion-exchange functional groups are capable of interacting with ions present in the eluant.

11. The apparatus of claim 10 wherein the first group of particles and the second group of particles are positioned in series.

12. The apparatus of claim 11 wherein the first group of particles is located before the second group of particles.

13. The apparatus of claim 10 wherein the complexing agent is capable of forming complexes with cations.

14. The apparatus of claim 13 wherein the complexing agent is selected from the group consisting of tetrahydrofuran-2,3,4,5-tetracarboxylic acid, ethylenediaminetetraacetic acid, N-hydroxyethylenediaminetetraacetic acid (HEDTA), diethylenetriaminepentaacetic acid (DTPA), porphine, dimercaprol, nitrilotriacetic acid, morpholine, vinylidene-1,1-diphosphonic acid, crown ethers, and mixtures thereof.

15. The apparatus of claim 13 wherein the complexing agent is a crown ether.

16. The apparatus of claim 15 wherein the complexing agent is a crown ether is selected from the group consisting of 9-crown-3, 12-crown4, 15-crown-5, 18-crown-6, 21-crown-7, 24-crown-8, 27-crown-9 and 30-crown-10.

17. The apparatus of claim 16 wherein the complexing agent is 18-crown-6.

18. The apparatus of claim 13 wherein the non-complexing agent ion-exchange functional groups are selected from the group consisting of sulfonate groups, carboxylate groups, phosphonate groups or a mixture thereof.

19. The apparatus of claim 18 wherein the non-complexing agent cation-exchange functional groups are a mixture of carboxylate and sulfonate groups.

20. The apparatus of claim 18 wherein the non-complexing agent cation-exchange functional groups are carboxylate groups.

21. The apparatus of claim 10 wherein the complexing agent functional group has a higher affinity for complexing with a single specific cation present in the eluant as compared to any other cation present in the eluant.

22. The apparatus of claim 21 wherein the single specific cation is selected from the group consisting of $K^+$, $Na^+$, $Li^+$, $NH_4^+$, $Ca^{++}$, $Mg^{++}$, $Sr^{++}$ and $Ba^{++}$.

23. The apparatus of claim 10 wherein the complexing agent is capable of forming complexes with anions.

24. The apparatus of claim 23 wherein the complexing agent is selected from the group consisting of crown ethers, cryptands, calixarenes, pyridine, unithiol, neutral Lewis Acid host molecule containing tin, mercury complexing agents, and mixtures thereof.

25. The apparatus of claim 23 wherein the non-complexing agent ion-exchange functional groups are selected from the group consisting of quaternary amines, alkanol quaternary amines, trimethylammonium, alkyl quaternary ammoniums, or a mixture thereof.

26. The apparatus of claim 10 wherein the complexing agent functional group has a higher affinity for complexing with a single specific anion present in the eluant as compared to any other anion present in the eluant.

27. The apparatus of claim 26 wherein the single specific anion is selected from the group consisting of fluoride, chloride, nitrite, bromide, nitrate, phosphate, and sulfate.

* * * * *